Feb. 23, 1926.
W. F. GALL
1,573,929
STRAINER
Filed April 17, 1925
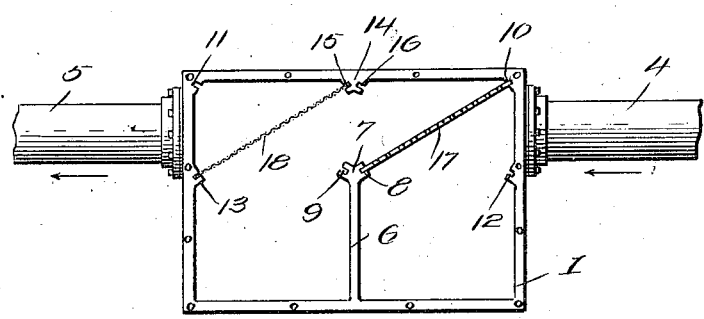
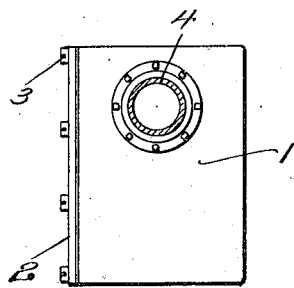
Inventor
W. F. Gall.
By Clarence O'Brien
Attorney Patented Feb. 23, 1926.

1,573,929

UNITED STATES PATENT OFFICE.

WILLIAM F. GALL, OF RUSSELLTON, PENNSYLVANIA.

STRAINER.

Application filed April 17, 1925. Serial No. 23,924.

*To all whom it may concern:*

Be it known that I, WILLIAM F. GALL, a citizen of the United States, residing at Russellton, in the county of Allegheny and State of Pennsylvania, have invented certain new and useful Improvements in a Strainer, of which the following is a specification.

This invention relates to improvements in strainers and is more particularly adapted for use in connection with a pump whereby the water which enters the pump from the feed line will be free of dirt and grit, thus enabling the pump to operate efficiently.

One of the important objects of the present invention is to provide a strainer which includes a casing having an inlet and an outlet, strainer elements being interposed between the inlet and outlet for removing the dirt or the like from water and delivering the same to a pump with which the outlet of the casing is connected in a clean condition, the sediment collecting in the bottom of the casing.

A still further object is to provide a strainer of the above mentioned character wherein the same is of such construction as to enable the strainer elements to be readily and easily removed from the casing as well as enabling the casing to be cleaned by removing the sediment therefrom.

A still further object is to provide a strainer of the above mentioned character which is simple in construction, inexpensive, strong and durable and further well adapted to the purposes for which it is designed.

Other objects and advantages of this invention will become apparent during the course of the following description.

In the accompanying drawing forming a part of this specification, and in which like numerals designate like parts throughout the same:

Figure 1 is a side elevation of the strainer embodying my invention showing the cover plate removed, and Figure 2 is an end elevation of the device.

In the drawing, wherein for the purpose of illustration is shown the preferred embodiment of my invention, the numeral 1 designates a substantially rectangular shaped casing the same being open on its front side, a removable cover plate 2 being provided for the open front side of the casing. Any suitable fastening means such as is shown at 3 is provided for removably securing the cover over the open front side of the casing. The casing communicates with a water inlet pipe 4, in the upper portion of one end thereof, the upper portion of the other end of the casing having associated therewith an outlet pipe 5 which connects the casing with a suitable pump (not shown). Extending upwardly from the intermediate portion of the casing 1 is the partition 6, the upper end thereof being spaced from the top of the casing as is clearly illustrated in Figure 1.

An enlargement 7 is formed on the upper portion of the transversely extending partition, and formed in this enlargement on opposite sides of the partition are the obliquely disposed guide grooves 8 and 9 respectively. The purpose thereof will hereinafter be more fully described.

A transversely extending guide groove 10 is formed in the upper corner of the casing adjacent the inlet end of the casing, and a similar guide groove 11 is formed in the opposite upper corner. A transversely extending guide groove 12 is formed in the inner side of the end of the casing below the inlet whereas a similar guide groove 13 is arranged on the opposite end of the casing below the outlet.

A transversely extending rib 14 is formed on the bottom face of the top of the casing and is arranged in alignment with the vertical transversely extending partition 6. The rib 14 has formed therein the obliquely disposed guide grooves 15 and 16, as clearly illustrated in Figure 1.

A pair of strainer elements or screens 17 and 18 respectively are associated with the casing, the perforations of the screen 17 being slightly larger than the perforations in the screen 18 so that one of the screens is coarse, while the other is fine. As is illustrated in Figure 1, the screen 17 has its upper edge supported in the guide groove 10, while the lower edge of the screen 17 rests in the obliquely disposed guide groove 8 formed in the enlargement 7 provided on the upper portion of the transversely extending partition 6. The screen 18 disposed parallel to the screen 17 has its upper edge disposed in the guide groove 15 and its lower edge resting in the guide groove 13. When the parts are arranged as shown in Figure 1, the water entering the casing 1 through the inlet pipe 4 will come in contact with the coarse screen 17, and will flow through the screen, the larger particles of dirt or grit dropping into the bottom of the casing on one side of the partition 6. The water will further be caused to pass through the finer screen 18 before it is discharged into the outlet pipe 5 from which it flows to the pump (not shown). The finer screen 18 will further separate the dirt and grit from the water which has passed through the openings in the coarser screen 17 and the sediment will collect in the bottom of the casing on the other side of the partition.

If desired, the obliquely disposed screen or strainer elements may be reversed so that the upper edge of the screen 17 will be disposed in the guide groove 16 while the lower edge of the screen 17 will rest in the guide groove 12. In a similar manner, the upper edge of the screen 18 will be received in the guide groove 11, while the lower edge of the screen 18 will rest in the guide groove 9, it being understood of course that the screens or strainer elements would at all times be disposed in parallel spaced relation with respect to each other.

By removing the cover plate 2, the screens or strainer elements may be readily removed from or inserted in position in the respective guide grooves, and enable the casing as well as the screens to be easily cleaned.

The purpose of the partition 6 is to provide a means for dividing the casing into separate compartments, and by having the upper edge of the partition terminating in spaced relation with respect to the cover or top, and being further provided with guide grooves which are disposed obliquely, a means is provided for supporting the lower edges of the screen depending upon the position in which it is desired to dispose the screen and in this manner, the screen may be readily inserted or removed without any difficulty.

It will thus be seen from the foregoing description, that a strainer has been provided whereby water will flow to a suitable pumping apparatus in a clean condition so that there will be no possibility of any foreign substance entering the pump and clogging up the same whereby the efficiency in the operation of the pump is affected.

While I have shown the preferred embodiment of the invention, it is to be understood that various changes in the size, shape and arrangement of parts may be resorted to without departing from the spirit of the invention and the scope of the appended claim.

Having thus described the invention, what I claim as new and desire to secure by Letters Patent is:—

A device of the class described comprising a substantially rectangular shaped casing open at its front side, a cover plate therefor, said casing being provided with an inlet in the upper portion of one end thereof, and an outlet in the upper portion of the opposite end, a transversely extending vertical partition arranged in the intermediate portion of the casing, the upper edge of said partition being spaced from the top of the casing, an enlargement formed on the upper edge of the partition, and provided with obliquely disposed guide grooves, a transversely extending rib formed on the bottom face of the top of the casing in vertical alignment with said partition, said rib being also provided with obliquely disposed guide grooves, said casing being provided with guide grooves in the upper corners thereof and additional guide grooves at points below the inlet and outlet respectively, said guide grooves being adapted to be disposed in pairs, and strainer elements removably supported in certain pairs of said guide grooves, the lower edge of one of the strainer elements being adapted to be supported in one of the obliquely disposed guide grooves formed in the enlargement on the upper edge of the partition.

In testimony whereof I affix my signature.

WILLIAM F. GALL.